United States Patent
Giefer et al.

(10) Patent No.: US 6,533,705 B1
(45) Date of Patent: Mar. 18, 2003

(54) SHIFTING DEVICE FOR THE GEARBOX OF A MOTOR VEHICLE

(75) Inventors: Andreas Giefer, Lamfields (DE); Roland Neughbauer, Abendsberg (DE); Peter Schiberna, Ingolstadt (DE)

(73) Assignees: ZF Lemförder Metallwaren AG (DE); Audi AG (DE)

(*) Notice: Subject to any disclaimer, the term of this patent is extended or adjusted under 35 U.S.C. 154(b) by 0 days.

(21) Appl. No.: 09/701,353

(22) PCT Filed: Mar. 21, 2000

(86) PCT No.: PCT/DE00/00845

§ 371 (c)(1),
(2), (4) Date: Nov. 22, 2000

(87) PCT Pub. No.: WO00/57088

PCT Pub. Date: Sep. 28, 2000

(30) Foreign Application Priority Data

Mar. 23, 1999 (DE) .......................... 199 13 005

(51) Int. Cl.[7] .......................... B60K 41/20; B60K 20/00
(52) U.S. Cl. .......................... 477/96; 74/473.24
(58) Field of Search .......................... 74/473.24, 473.25, 74/473.26; 477/96, 99

(56) References Cited

U.S. PATENT DOCUMENTS

| | | | | |
|---|---|---|---|---|
| 1,175,563 A | * | 3/1916 | Schlatter | 74/473.24 |
| 3,525,272 A | | 8/1970 | Olson | |
| 4,572,340 A | | 2/1986 | Pierce | |
| 4,966,262 A | | 10/1990 | Mieczkowski | |
| 4,976,171 A | * | 12/1990 | Sharp et al. | 477/96 |
| 4,986,143 A | * | 1/1991 | Livshits et al. | 477/99 X |
| 5,009,295 A | * | 4/1991 | Kinkade et al. | 477/99 X |
| 5,200,728 A | * | 4/1993 | Patterson et al. | 335/223 |
| 5,211,271 A | * | 5/1993 | Osborn et al. | 477/99 X |
| 5,251,723 A | * | 10/1993 | Rolinski et al. | 477/99 X |
| 5,285,694 A | * | 2/1994 | Chene | 74/473.24 |
| 5,542,891 A | * | 8/1996 | Kettle, Jr. et al. | 477/96 |
| 5,566,581 A | * | 10/1996 | Smale et al. | 477/99 X |
| RE35,772 E | * | 4/1998 | Ratke et al. | 477/96 X |
| 5,954,616 A | * | 9/1999 | Snell et al. | 477/99 |
| 6,007,451 A | * | 12/1999 | Masui et al. | 477/99 X |

FOREIGN PATENT DOCUMENTS

| | | | |
|---|---|---|---|
| DE | 34 19 168 A1 | 11/1985 | |
| DE | 41 18 519 A1 | 2/1993 | |
| DE | 42 17 773 A1 | 12/1993 | |
| DE | 194 14 554 A1 | 10/1996 | |
| DE | 195 14 554 C2 | 10/1996 | |
| EP | 0179951 * | 5/1986 | 74/473.24 |
| EP | 0519208 A1 | 12/1992 | |
| EP | 0785380 A1 | 7/1997 | |
| JP | 2-138568 | 5/1990 | |

* cited by examiner

*Primary Examiner*—Sherry Estremsky
*Assistant Examiner*—Roger Pang
(74) *Attorney, Agent, or Firm*—McGlew and Tuttle, P.C.

(57) ABSTRACT

A shifting device is disclosed for automatic transmissions of motor vehicles with a selector lever, which is pivotable around at least one axis and by which the gears defined by the transmission of the motor vehicle can be selected. A shift position of the selector lever is associated with each gear. An actuator cooperates with a locking member, which is pivotable around an axis. The locking member is pivotable by the actuator around the axis and has an engaging contour corresponding to the particular shift position of the selector lever on the side facing the selector lever. The selector lever can thus be locked in each shift position.

6 Claims, 5 Drawing Sheets

SHIFTING DEVICE FOR THE GEARBOX OF A MOTOR VEHICLE

FIELD OF THE INVENTION

The present invention pertains to a shifting device as can be used especially for automatic and automated transmissions of motor vehicles.

BACKGROUND OF THE INVENTION

Such shifting devices, with locking members of various designs, have been known in various embodiments. As a consequence of the steadily increasing safety requirements and various national laws, it is necessary to take precautionary measures on shifting devices of this type which prevent, e.g., the undesired or unauthorized selection of a gear or the starting of the engine with the transmission in gear. To increase the safety against operating errors, two systems are used in combination with shifting devices. These systems are known under the names "keylock" and "shiftlock".

In the "keylock" system, the ignition key can be inserted and the engine can be started only when the selector lever is in the parking position "P." When the vehicle is parked, the ignition key can be removed in the parked position only. Applying the parking brake is thus mandatory and an accidental removal of the ignition key during travel can be effectively prevented.

The "shiftlock" system forces the driver to correctly position his feet on the break pedal. The "shiftlock" system permits a gear to be selected from the parking position or optionally from the neutral position only when the brake is actuated.

It is also known that both systems can be combined with one another.

In vehicles with automatic transmissions, the selector lever is moved after the engine has been started from a neutral position (P or N position) into a driving position (e.g., "D") in order to start the vehicle moving.

The vehicle may unintendedly start moving if the selector lever is moved, e.g., from the neutral position into a drive position by mistake with the engine running. To prevent such operating errors and to prevent shifting from a gear with high speed of the transmission into a gear with low speed by mistake, a shifting device for automatic transmissions of motor vehicles has been known from DE 41 18 519 A1, which has a catch-type locking mechanism. A locking element is arranged here at the selector lever. The locking element cooperates with a catch. The catch is in turn mounted pivotably around an axis. The locking element engages a contour made in one piece with the catch in the locked position. The catch permanently engages the locking element via a leg spring.

To abolish the locking effect on the selector lever, an electromagnet is actuated, whose armature is extended during energization, as a result of which a simple "currentless lock" has been embodied. The electromagnet is actuated via a central electronic processing unit (CPU) of the motor vehicle This control unit detects signals from a speed sensor, a brake pedal sensor, a selector lever position sensor, and the ignition of the engine.

Consequently, the shiftlock and keylock systems can be embodied with such a shifting device. Furthermore, errors in operating the selector lever from different shift positions can be effectively prevented.

However, it is disadvantageous in the solution described in DE 41 18 519 A1 that the shifting movement of the selector lever is locked in one direction of movement of the selector lever only. The shifting movement in the opposite direction (shifting up the gears) is possible at any time. Furthermore, abuse of the shifting mechanism, i.e., forcible upshifting or downshifting, cannot be prevented with this prior-art design at all because the catch is pressed against the locking element by a leg spring only.

SUMMARY AND OBJECTS OF THE INVENTION

The basic technical object of the present invention is to provide a shifting device for automatic transmissions of motor vehicles which has a simple design and makes it possible to lock the selector lever in each shift position. The "keylock" and "shiftlock" systems should also be embodied for safety reasons.

According to the invention, a shifting device for automatic transmissions of motor vehicles is provided with a selector lever, which is pivotable around at least one axis and by means of which the gears defined by the transmission of the motor vehicle can be selected. An actuating means, and a locking member, pivotable around an axis or movable with a direction of movement in one plane (linear), are also provided. The locking member is pivoted by the actuating means around the axis or is moveable by the actuating means and has an engaging contour corresponding to each shift position of the selector lever on the side facing the said selector lever. The selector lever can thus be locked in each shift position.

According to the present invention, the shifting device for automatic transmissions of motor vehicles has a selector lever, which is pivotable around at least one axis and by means of which the gears (P, R, N, D, . . . ) defined by the transmission of the motor vehicle can be selected, wherein a shift position of the selector lever is associated with each gear.

Moreover, the actuating means, which cooperates with a locking member pivotable around an axis according to a first embodiment of the solution to the problem, is present on the shifting device. The locking member has, on the side facing the selector lever, an engaging contour corresponding to the particular shift position of the selector lever. The engaging contour is designed according to the present invention such that it accommodates the selector lever in each shift position in a positive-locking manner and thus effectively locks it.

Corresponding to another solution to the technical problem, it is also possible to provide an actuating means which cooperates with a locking member movable with a direction of movement in one plane. The locking member, which can thus be pivoted or displaced with a direction in one plane, also has, on the side facing the selector lever, an engaging contour corresponding to the particular shift position of the selector lever, so that the selector lever can be locked in each shift position.

A shifting device according to the present invention has an extremely simple design and can therefore be manufactured at low cost. Only a locking member and an actuating means cooperating with same are needed to lock the selector lever reliably and with certainty in each desired position.

The "shiftlock" and "keylock" systems can be transposed in a simple manner.

In another embodiment of the present invention, provisions are made for the mechanical, electric, electromagnetic, hydraulic or pneumatic actuating means to press the locking member against the selector lever in the locked state or to pull it to the selector lever, so that the section of the engaging contour associated with the shift position immovably fixes the selector lever.

In an advantageous manner, the actuating means may be an electromagnet. If an electromagnet is used as the actuating means, a design having an armature pulled in, in the non-energized state shall be preferably used. The locking member is pressed by this pulled-in armature against the selector lever or is pulled to the selector lever, as a result of which a "currentless lock" can be obtained in a simple manner. If the electromagnet is energized, the armature must be extended against the force of a spring, which returns the armature into its starting position in the non-energized state. Such electromagnets have been known and it is consequently possible to use a standard component for a shifting device according to the present invention.

In another embodiment if the present invention provisions are, furthermore, made for the shift position of the selector lever to be detected by at least one signal transmitter. Furthermore, the brake of the motor vehicle and/or the ignition lock has at least one signal transmitter each, where all signals are sent together with at least one travel condition signal of the transmission of the motor vehicle to a central control unit (CPU), which activates or deactivates the electromagnet ba on the evaluation of predefined parameters. This signal-dependent control makes it possible, in combination with a shifting device according to the present invention for an automatic transmission of a motor vehicle, to embody the keylock and shiftlock system as well as the prevention of errors in the operation of the shifting device in a simple and inexpensive manner.

The present invention also describes a locking member for locking the selector lever, which is characterized by a three-dimensional negative shape of the lower end of the selector lever.

The above-mentioned features of the present invention, which will be explained below, can, of course, be used not only in the particular combination mentioned, but also in other combinations or alone without going beyond the scope of the present invention.

Other advantageous embodiments of the present invention will be explained in greater detail below with reference to the corresponding drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
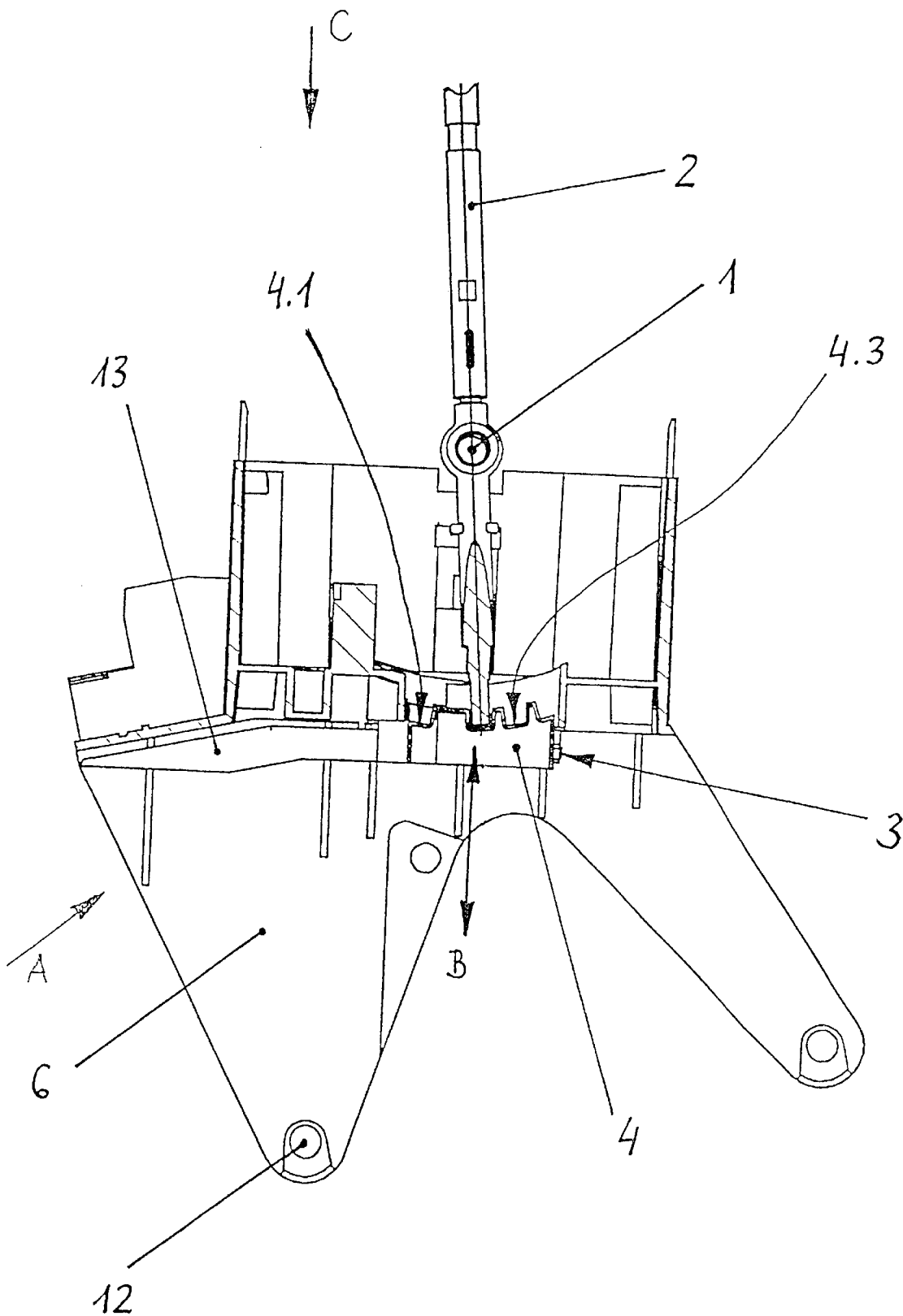
FIG. 1 is a simplified view showing a detail of a shifting device according to the present invention for automatic transmissions of motor vehicles.

Referring to the drawings in particular, the figures show a preferred embodiment of a shifting device according to the present invention for automatic transmissions of motor vehicles. In such a shifting device, a selector lever 2 is mounted in a housing 6 pivotably around an axis 1. In addition, the selector lever 2 in the shifting device being shown is pivotable around a second axis extending at right angles to the axis 1. A movement of the selector lever 2 around the axis 1 makes it possible to select the individual gears within an automatic gate.

It the selector lever is pivoted around the second axis extending at right angles to the axis 1, gate change, e.g., to a tipping shift gate, is possible. Upshifting or downshifting by one transmission gear each can be brought about within this tipping shift gate by a tipping movement by means of the selector lever in the known manner. The selector lever can be pivoted here from one shift position (e.g., the shift position "D") into the tipping shift gate. It is now moved within a gear shifting gate 15. The gearshift lever has an axial extension under the axis 1.

A locking member 4 is pivotable around an axis 3. As is apparent from the view in FIG. 2, the locking member 4 has the shape of a U. It has an engaging contour 4.1, 4.2, 4.3, which can be caused by an actuating means, an electromagnet 5 in this case, to engage the lower end of the selector lever. The axis 3 is formed by a bolt each, which passes through one of the legs of the U-shaped locking member.

Figure 1A:
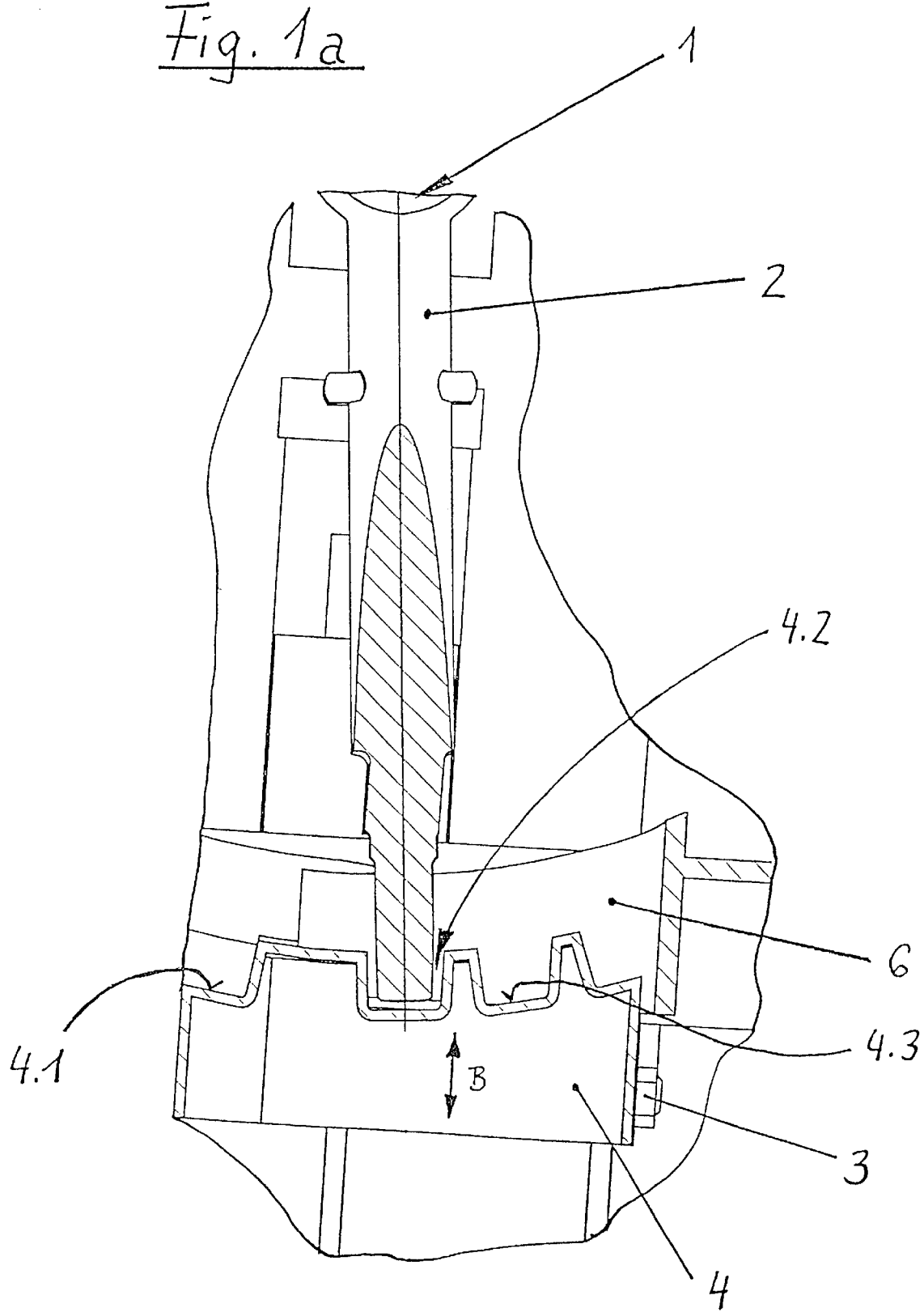
FIG. 1a is an enlarged view showing a detail of the engaging contour of the locking member.

As can be recognized especially from FIGS. 1 and 1a, the locking member 4 has an engaging contour complementary to each shift position of the selector lever 2 for the path traveled by the axial extension of the selector lever and the path traveled by this. Thus, it forms a three-dimensional negative shape of the lower end of the selector lever 2, which means that the selector lever can be locked in each shift position. The combination with a signal control is meaningful here.

Any shifting error is thus effectively prevented with a shifting device according to the present invention.

The emergency release lever 13 made in one piece with the locking member 4 is rather nonessential for the present invention. It is only an additional safety measure, which makes it possible to release the selector lever in case of a failure of all systems, so that the vehicle can still be driven at least to the repair shop.

Figure 2:
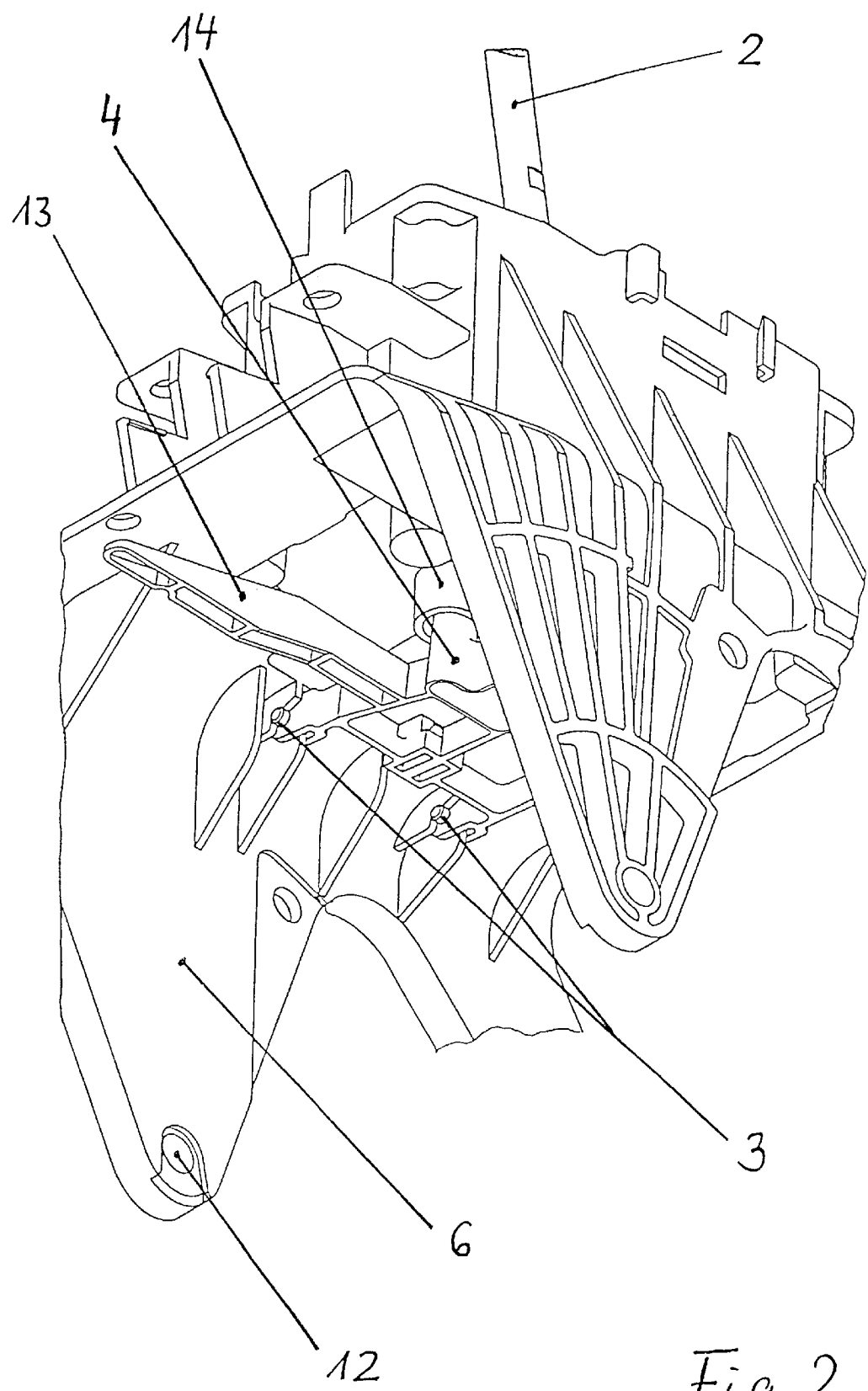
FIG. 2 is a three-dimensional view of a shifting device according to the present invention in a view corresponding to the direction of arrow A in FIG. 1.
Figure 3:
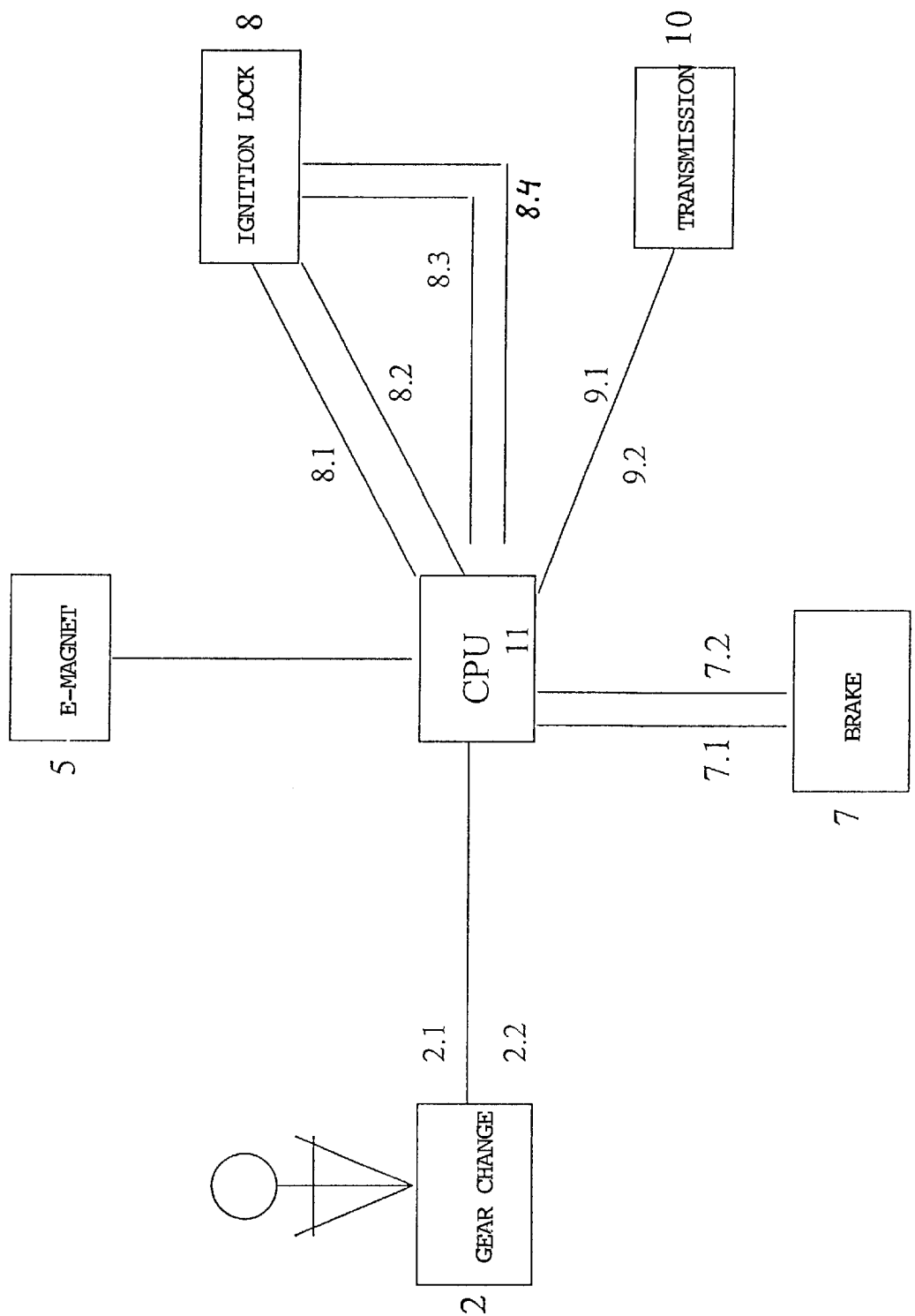
FIG. 3 is the schematic diagram of an electronic control for a shifting device according to the present invention for automatic transmissions of motor vehicles.
Figure 4:
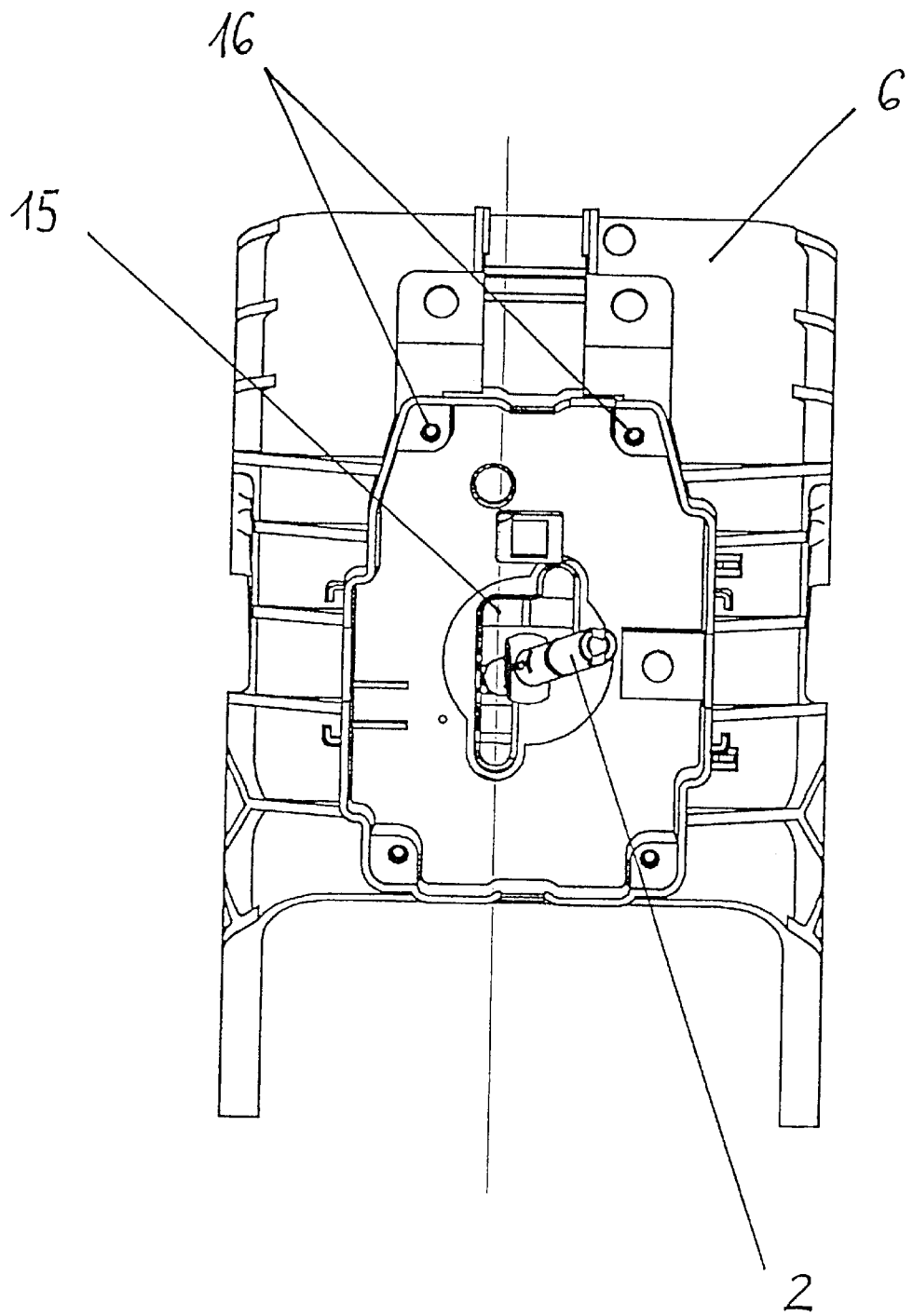
FIG. 4 is a view of the shifting device according to arrow C in FIG. 1.

Furthermore, housing fastenings 12, which make it possible to fix the shifting device in the motor vehicle, are arranged on the housing 6. FIG. 2 also shows how the locking member 4 engages a selector lever housing socket 14, To cover the entire shifting device, a shift cover, not shown here, is used. The fastening openings for mounting this shift cover are designated by 16 in, FIG. 4. The actuating means with the electromagnet 5 is not shown in FIGS. 1, 1a and 2 for the sake of greater clarity. The armature of the electromagnet 5 is moved in the energized state to an extended position. The armature is in a position in the area between the axis 3 and the engaging contour 4.1, 4.2, 4.3 of the locking member 4.

In an advantageous manner, the electromagnet 5 is a design having an armature pulled in, in the non-energized state by the force of a spring 5. In the embodiment of FIGS. 1, 1A and 2 the movement B is about the pivot 3. The direction of movement B may also be in a plane (or linear). The locking member 4 is pressed by this pulled-in armature against the selector lever 2 or is pulled to the selector lever, as a result of which a "currentless lock" can be obtained in a simple manner. If the electromagnet 5 is energized, the armature must be extended against the farce of the spring, which returns the armature into its starting position in the non-energized state. Such electromagnets 5 with cooperating spring have been known and it is consequently possible to use a standard component for a shifting device according to the present invention.

A shifting device according to the present invention for automatic transmissions of motorvehicles function predominantly without mechanical elements purely electronically. The shift positions of the gearshift lever are detected by a shift position signal generated by a signal transmitter. The signals are digital or analog signals. The brake 7 of the motor vehicle has a signal transmitter, which sends the following signals to a central control unit 11:

First: "Brake depressed" (7.1), second: "Brake not depressed" (7.2).

The ignition lock 8 of the motor vehicle also contains a signal pickup, which detects the signals "Lock ignition lock" 8.1 and "Release ignition lock" 8.2 from the central control unit 11: In addition, the ignition lock 8 has a signal transmitter, which sends the signals "Ignition lock locked" 8.3 and "Ignition lock released" 8.4 to the central control unit 11. All signals are evaluated together with a travel condition signal 9.1 or 9.2 of the transmission 10 of the motor vehicle in the central (control unit 11, and these activate or deactivate the electromagnet 5 taking into account predefined parameters.

For example, the speed of the transmission can be detected as the travel condition signal. It is thus possible to permit a change of the gear only at predetermined speeds of the motor vehicle, with the electromagnet cooperating with the locking member 4 and releasing the selector lever 2 by pivoting the locking member 4 around the axis 3.

Contrary to this, the selector lever is locked if parameters are not met, e.g., beginning from or up to a certain speed, so that the change of gear is not possible in this case.

In summary, a simple possibility of locking the selector lever in each gear of the selector lever has been created with the shifting device according to the present invention for automatic transmissions of motor vehicles. The entire system is affected by a central control unit. The "keylock" and "shiftlock" functions can thus be embodied with the central control unit and, moreover, any shifting error of the selector lever can be avoided, so that both errors in the operation and abuse of the motor vehicle (protection against theft) can be avoided.

while specific embodiments of the invention have been shown and described in detail to illustrate the application of the principles of the invention, it will be understood that the invention may be embodied otherwise without departing from such principles.

What is claimed is:

1. A motor vehicle automatic transmission shifting device comprising:

a selector lever mounted pivotably around at least one axis for selecting gears defined by the transmission of the motor vehicle;

an actuator; and a locking member mounted pivotably around a locking member axis, said locking member being pivoted by said actuator around said locking member axis and having an engaging contour corresponding to each shift position of the selector lever on a side facing said selector lever for locking said selector lever in each shift position, said locking member having a three-dimensional shape corresponding to a shape of the lower end of the selector lever.

2. A motor vehicle automatic transmission shifting device in accordance with claim 1, wherein said actuator is an electromagnet.

3. A motor vehicle automatic transmission shifting device in accordance with claim 1, further comprising:

a signal transmitter generating a shift position signal based on the shift position of said selector lever;

a signal transmitter generating a brake actuation signal in response to motor vehicle brake actuation;

a device generating a motor vehicle transmission travel condition signal; and a central control unit receiving said shift position signal, said brake actuation signal and said motor vehicle transmission travel condition signal and controlling said actuator based on the evaluation of predefined parameters.

4. A motor vehicle automatic transmission shifting device in accordance with claim 1, further comprising:

a central control unit receiving signals and controlling said actuator based on an evaluation of predefined parameters;

a device generating a motor vehicle transmission travel condition signal; and a signal transmitter generating a shift position signal based on the shift position of said selector lever;

a motor vehicle brake signal transmitter sending brake actuation signals to said control unit including a brake depressed signal and a brake not depressed signal;

a motor vehicle ignition lock signal pickups detecting ignition lock signals from said central unit including a lock ignition lock signal and a release ignition lock signal;

a motor vehicle ignition lock signal transmitter for sending signals to said control unit including an ignition lock is locked signal and an ignition lock is released signal, said control unit evaluating the received signals for said evaluation of predefined parameters.

5. A motor vehicle automatic transmission shifting device in accordance with claim 4, wherein said signals are digital or analog signals.

6. A motor vehicle automatic transmission shifting device comprising:

a selector lever mounted pivotably around at least one axis for selecting gears defined by the transmission of the motor vehicle;

an actuator; and a movable locking member, said locking member being moved by said actuator and having an engaging contour corresponding to each shift position of the selector lever on a side facing said selector lever for locking said selector lever in each shift position said locking member has a three-dimensional shape corresponding to a shape of the lower end of the selector lever.

* * * * *